(12) United States Patent
Rosen et al.

(10) Patent No.: US 9,553,659 B2
(45) Date of Patent: Jan. 24, 2017

(54) SYSTEMS AND METHODS FOR DIRECTING COMMUNICATION SIGNALS TO MOBILE PLATFORMS

(71) Applicant: The Boeing Company, Seal Beach, CA (US)

(72) Inventors: Harold A. Rosen, El Segundo, CA (US); Lisa Kuo, El Segundo, CA (US); Stephen Floyd Sichi, El Segundo, CA (US); Joshua Maxwell Rutheiser, Seattle, WA (US); Mike T. Trujillo, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 13/888,415

(22) Filed: May 7, 2013

(65) Prior Publication Data

US 2014/0335780 A1    Nov. 13, 2014

(51) Int. Cl.
| | | |
|---|---|---|
| *H04B 7/185* | (2006.01) | |
| *H01Q 1/28* | (2006.01) | |
| *H01Q 3/00* | (2006.01) | |
| *H01Q 19/17* | (2006.01) | |
| *H01Q 21/08* | (2006.01) | |
| *H01Q 25/00* | (2006.01) | |

(52) U.S. Cl.
CPC .......... *H04B 7/18578* (2013.01); *H01Q 1/288* (2013.01); *H01Q 3/00* (2013.01); *H01Q 19/17* (2013.01); *H01Q 21/08* (2013.01); *H01Q 25/007* (2013.01)

(58) Field of Classification Search
CPC ..... H01Q 1/288; H04B 7/18578; H04B 7/185; H04B 7/18502; H04B 7/18506; H04B 7/18508; H04B 7/1851; H04B 7/18513; H04B 7/18515; H04B 7/18523
USPC .......................................... 455/12.1, 427–430
See application file for complete search history.

(56) References Cited

U.S. PATENT DOCUMENTS

| | | | | |
|---|---|---|---|---|
| 4,315,262 A | * | 2/1982 | Acampora et al. | ........... 342/352 |
| 4,439,773 A | | 3/1984 | Chu | |
| 4,819,227 A | * | 4/1989 | Rosen | ...... 455/13.3 X |
| 4,872,015 A | * | 10/1989 | Rosen | ...... 455/13.3 X |
| 7,167,704 B2 | | 1/2007 | Chang et al. | |
| 7,181,162 B2 | | 2/2007 | Chang et al. | |
| 7,187,949 B2 | | 3/2007 | Chang et al. | |
| 7,483,672 B2 | | 1/2009 | Hart et al. | |

(Continued)

FOREIGN PATENT DOCUMENTS

GB    2303764 A    2/1997

OTHER PUBLICATIONS

Partial European Search Report of Application No. 14167426.7; Sep. 15, 2014; 5 pages.

*Primary Examiner* — Philip Sobutka
(74) *Attorney, Agent, or Firm* — Armstrong Teasdale LLP (57) ABSTRACT

A method and system for communication with a mobile platform is provided. An antenna system coupled to a transmitter for use in providing a communication channel to a mobile user includes a first linear transmit array of radiating horns, a second linear transmit array of radiating horns, and at least one reflector coupled to at least one of the first linear transmit array and the second linear transmit array, the at least one reflector configured to reflect illumination from the first and second linear transmit arrays to form a communication channel for the mobile user.

11 Claims, 7 Drawing Sheets

(56) References Cited

U.S. PATENT DOCUMENTS

| | | |
|---|---|---|
| 7,505,736 B2 | 3/2009 | Min et al. |
| 7,809,403 B2 | 10/2010 | Chang et al. |
| 7,929,984 B2 | 4/2011 | Chang et al. |
| 8,396,513 B2 | 3/2013 | Chang et al. |

\* cited by examiner

SYSTEMS AND METHODS FOR DIRECTING COMMUNICATION SIGNALS TO MOBILE PLATFORMS

BACKGROUND OF THE INVENTION

The field of the disclosure relates generally to a communication system, and more specifically, to methods and systems for providing communication to mobile platforms.

The demand for high speed internet for travelling users e.g., passengers onboard flights, has increased in parallel to the technology development of mobile devices. Generally, travelling users are limited to capabilities provided by air-to-ground networks which can lose connectivity in certain locations, such as the ocean. Some known systems, provide users internet through satellite coverage but such coverage can be costly and only provide a user enough bandwidth to perform basic browsing and may not be able to stream entertainment content.

BRIEF DESCRIPTION

In one aspect, an antenna system coupled to a transmitter for use in providing a communication channel to a mobile user is provided. The system includes a first linear transmit array of radiating horns, a second linear transmit array of radiating horns, and at least one reflector coupled to at least one of the first linear transmit array and the second linear transmit array, the at least one reflector configured to reflect illumination from the first and second linear transmit arrays to form a communication channel for the mobile user.

In another aspect, a communication system for use in providing a communication channel to a mobile user is provided. The communication system includes a ground station and a transmitter communicatively coupled to the ground station. The transmitter includes a first linear transmit array of radiating horns, a second linear transmit array of radiating horns, and at least one reflector coupled to at least one of the first linear transmit array and the second linear transmit array, the at least one reflector configured to reflect illumination from the first and second linear transmit arrays to form a communication channel for the mobile user.

In yet another aspect, a method of providing a communication channel to a mobile user is provided. The method includes providing a communication channel from a transmitter located in a substantially stationary position to a mobile user, wherein a 1:1 relationship exists between a carrier frequency of the communication channel and a location of the mobile user and moving the communication channel in response to the movement of the mobile user.

The features, functions, and advantages that have been discussed can be achieved independently in various embodiments or may be combined in yet other embodiments, further details of which can be seen with reference to the following description and drawings.

DETAILED DESCRIPTION

The systems and methods described herein enable a communication system to provide two-way communication with a mobile user that is moving and unable to connect and/or utilize terrestrial networks. The system provides steerable fan beams that enable mobile users to sustain communication throughout travel. As used herein, a "beam", "spot beam", or "fan beam" may refer to any wireless communication link and/or communication path used for communication between a mobile user and a communication system, including, but not limited to communication within the Ka-Band.

Exemplary technical effects of the methods and systems described herein include at least one of (a) providing a communication channel from a transmitter located in a substantially stationary position to a mobile user, wherein a 1:1 relationship exists between a carrier frequency of the communication channel and a location of the mobile user, and (b) moving the communication channel in response to the movement of the mobile user.

Figure 1:
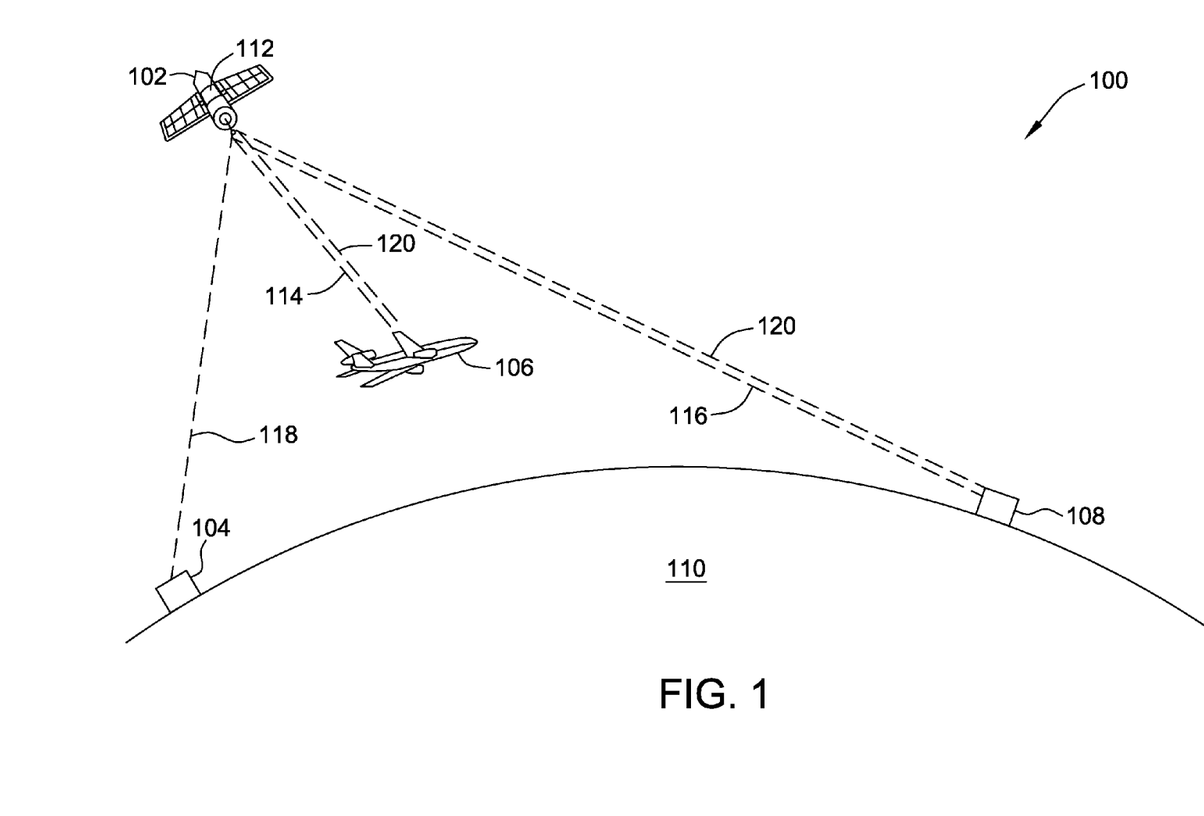
FIG. 1 is a schematic diagram of an exemplary communication system.

FIG. 1 is a schematic diagram of an exemplary communication system 100. In the exemplary embodiment, communication system 100 includes a transmitter or satellite 102, a ground station 104, a first mobile user 106, and a second mobile user 108. Satellite 102 is coupled in wireless communication with ground station 104 for communicating with at least one of first and second mobile users 106 and 108 traveling on or above the Earth 110, as is described in more detail below. As used herein, a "mobile user" may refer to any portable communication and/or computing device including, but not limited to, a mobile phone, a smartphone, a laptop, a tablet computer, or any other similar portable communication and/or computing device. In one embodiment, a "mobile user" may include any movable object utilizing a portable communication and/or computing device, including, but not limited to, a person, a vehicle, an aircraft, and a ship.

In the exemplary embodiment, satellite 102 is a geostationary satellite. That is, satellite 102 has a circular geosynchronous orbit that is substantially directly above the Equator of the Earth 110. Alternatively, satellite 102 may be a non-geostationary satellite, or be any other type of satellite that enables system 100 to function as described herein. Further, system 100 may include any number of satellites that enables system 100 to function as described herein.

In the exemplary embodiment, satellite 102 includes an antenna assembly 112. Antenna assembly 112 facilitates two-way communication between mobile users (e.g., user 106 and/or user 108) and ground station 104, as described in more detail below. Antenna assembly 112 communicates with mobile users 106 and 108 through fan beams 114 and 116 that move and/or travel with users 106 and 108 as users 106 and 108 traverse on or above the Earth 110. Additionally, antenna assembly 112 communicates with ground station 104 through a ground station communication path 118. In one embodiment, antenna assembly 112 transmits a global broadcast beam 120 that is configured to provide signals and/or data to all users of communication system 100 and/or satellite 102. In this embodiment, global broadcast beam 120 is a beam configured to provide 1-way communication to users of system 100. In one embodiment, antenna assembly 112 is included on ground station 104 such that ground station 104 directly communicates with mobile users 106 and/or 108 through fan beams 114 and 116 that move and/or travel with users 106 and 108 as users 106 and 108 traverse on or above the Earth 110.

Figure 2:
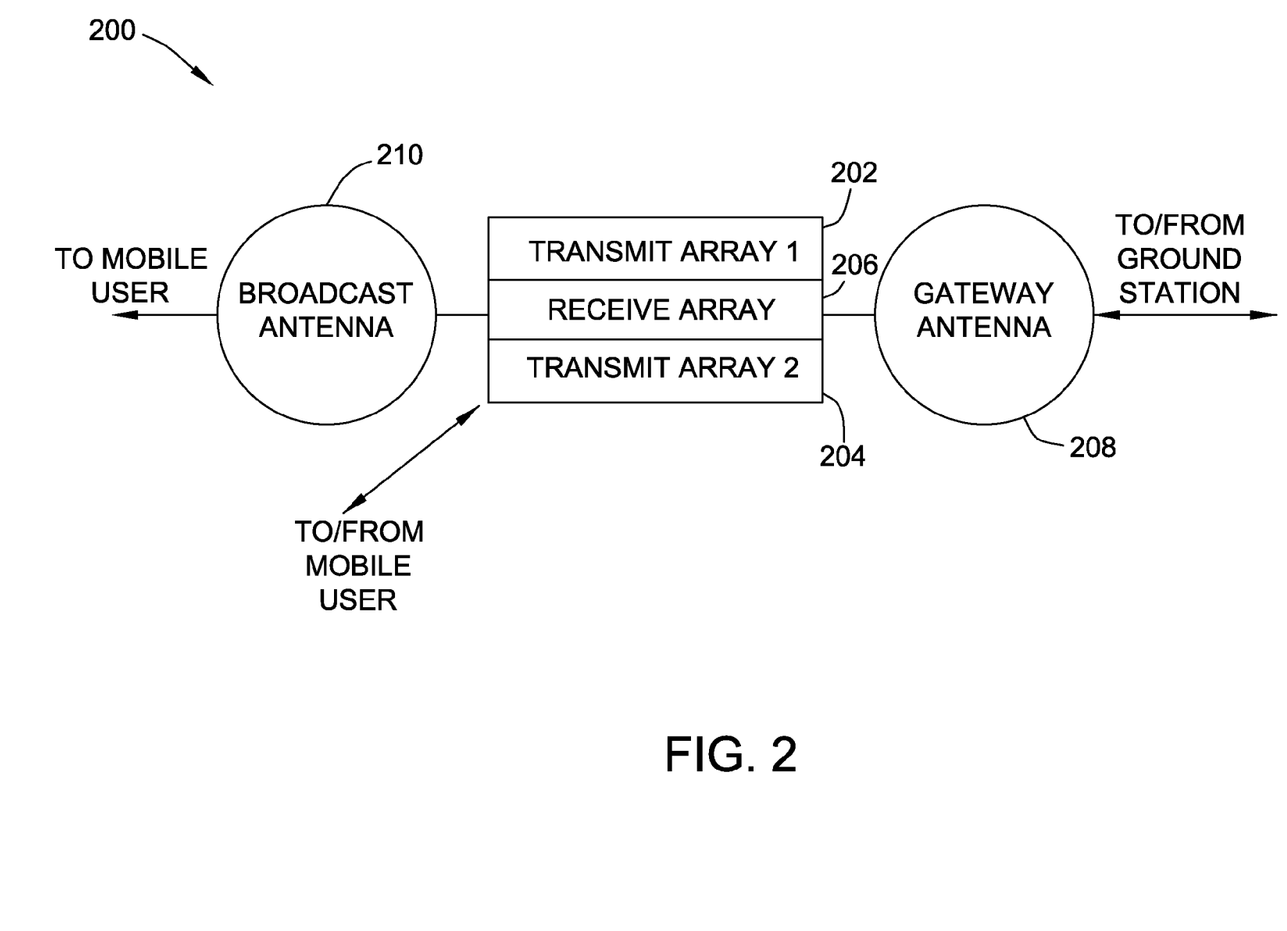
FIG. 2 is a schematic diagram of an exemplary antenna assembly that may be used with the system shown in FIG. 1.

FIG. 2 is a schematic diagram of an exemplary antenna assembly 200, such as antenna assembly 112, which may be used with system 100 (both shown in FIG. 1). Antenna assembly 200 includes a first linear transmit array 202, a second linear transmit array 204, a receive array 206, and a gateway antenna 208. In one embodiment, antenna assembly 200 includes a broadcast antenna 210.

In the exemplary embodiment, each of arrays 202, 204, and 206 include a plurality of radiating horns. In one embodiment each array 202 and 204 includes 64 radiating horns. Alternatively, any number of horns can be used to facilitate communication as described herein. In the exemplary embodiment, horns are oriented in linear fashion in the direction of one axis, including, but not limited to, North to South (y-axis) and East to West (x-axis). Alternatively, horns may be oriented in any configuration that enables arrays 202, 204, and 206 to function as described herein. In the exemplary embodiment, array 206 is configured to receive signals transmitted from mobile users and arrays 202 and 204 are configured to transmit beams to mobile users that are movable along an axis (e.g., x-axis and y-axis) in response to movement of a mobile user.

Transmit arrays 202 and 204 are each communicatively coupled to an offset cylindrical reflector (not shown) that is configured to transmit beams from transmit arrays 202 and 204. In one embodiment, each offset cylindrical reflector is about 63 inches in length and oriented parallel to transmit arrays 202 and 204. Alternatively, cylindrical reflectors can have any length and be oriented in any manner that facilitates communication as described herein. The cylindrical shape of the reflector enables transmit arrays 202 and 204 to transmit localized or focused fan beams for communication with mobile users. In the exemplary embodiment, transmit arrays 202 and 204 are configured to provide a single communication channel or fan beam (e.g., beam 114 or beam 116) to a mobile user utilizing a combination of two beams transmitted by arrays 202 and 204 (as described below). The use of transmit arrays 202 and 204 enables antenna assembly 200 to provide 476 concurrent beams for use by mobile users to facilitate the transmission of data. It should be noted that any number of concurrent beams can be utilized based on an amount of power in satellite 102 and/or power requirements of radiating horns. Signals from transmit arrays 202 and 204, and signals from satellite 102 may be transmitted using either analog or digital transformations.

Gateway antenna 208 is configured to receive and/or transmit signals from/to remote devices, such as ground station 104. Broadcast antenna 210 transmits a global broadcast beam, such as beam 120, which is configured to provide signals and/or data to all users of satellite 200 in a 1-way broadcast manner. Such a beam enables mobile users to obtain a continuous stream of information including, but not limited to, entertainment data and/or weather information.

Figure 3:
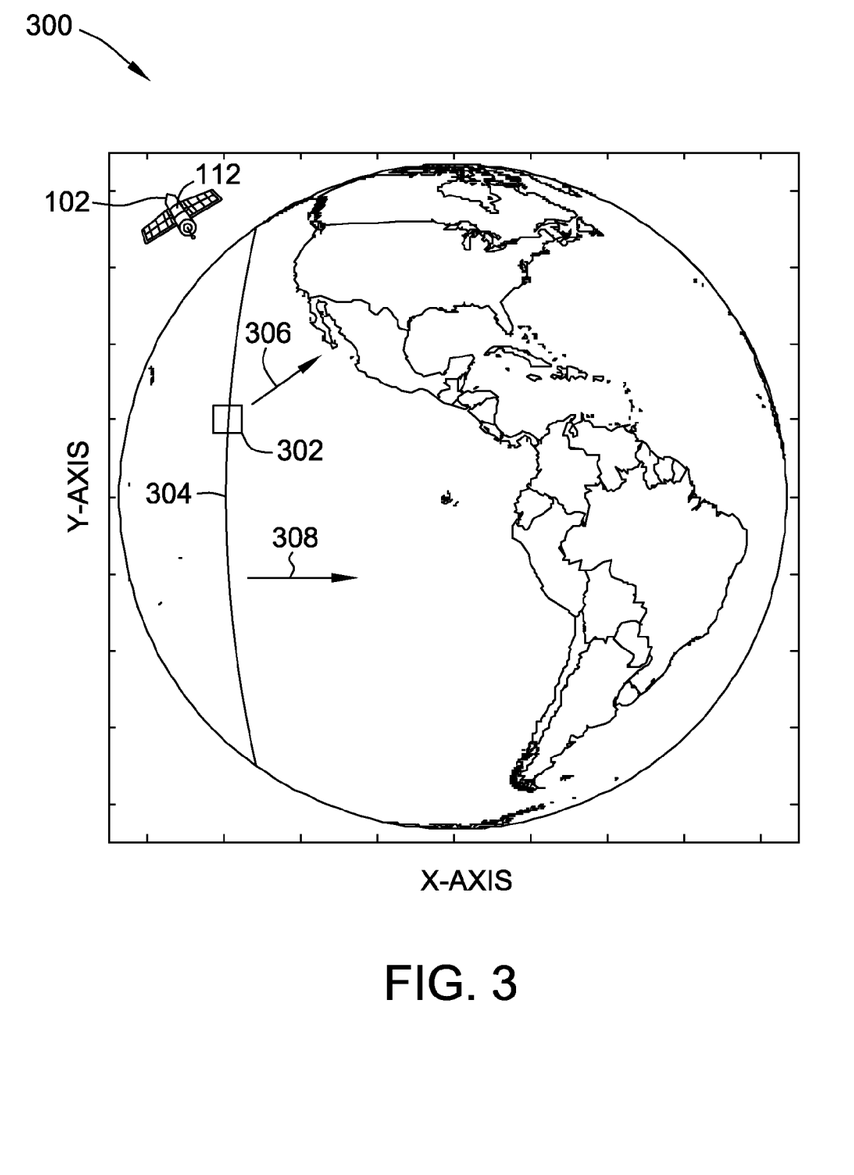
FIG. 3 is a schematic diagram illustrating an exemplary method of communicating with a mobile user using the system shown in FIG. 1.
Figure 4:
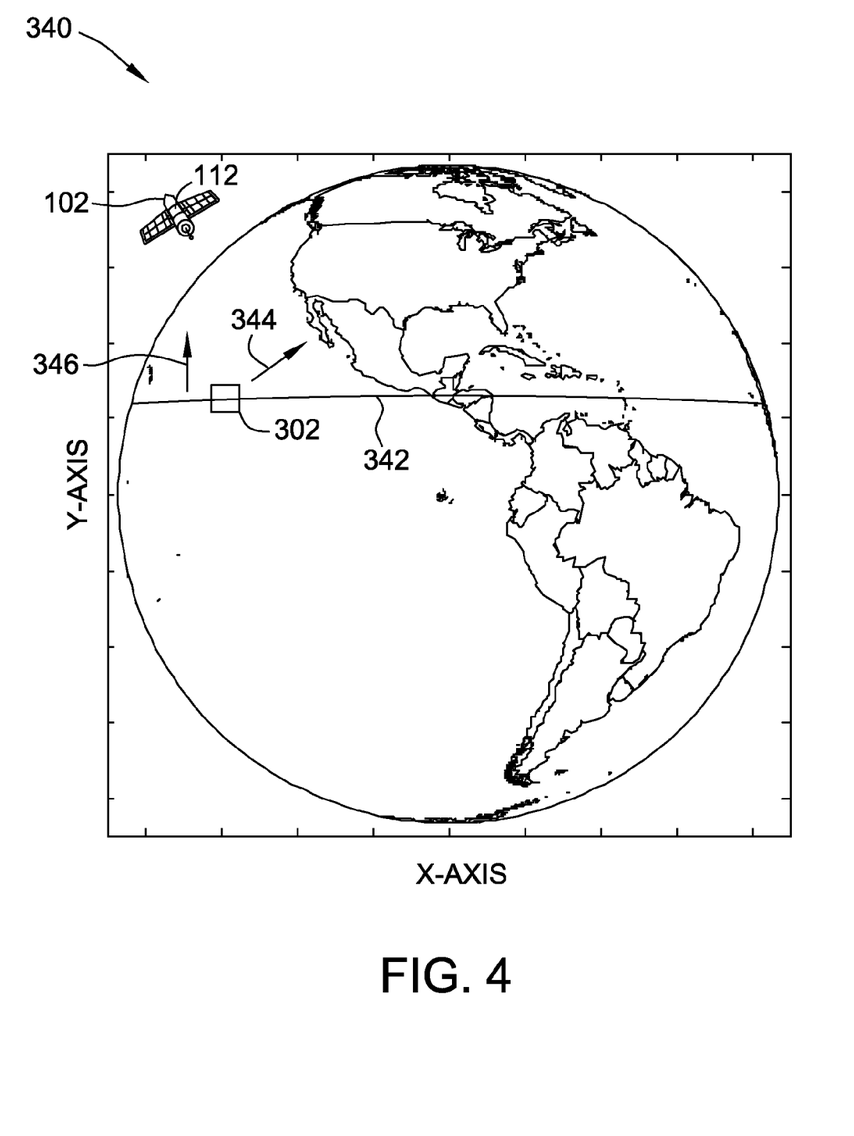
FIG. 4 is a schematic diagram illustrating an alternative method of communicating with a mobile user using the system shown in FIG. 1.

FIG. 3 is a schematic diagram illustrating an exemplary method 300 of communicating with a mobile user mobile user 302 and FIG. 4 is a schematic diagram illustrating an alternative method 340 of communicating with a mobile user mobile user 302. Each of methods 300 and 340 communicate with mobile user 302 using a communication system, such as communication system 100 (shown in FIG. 1). Components of communication system 100 shown in method 300 of FIG. 3 and method 340 of FIG. 4 are labeled with the same reference numbers used in FIG. 1.

Referring to FIG. 3, satellite 102 and/or antenna assembly 112 transmits a steerable fan beam 304 to user 302. Beam 304 is substantially parallel with the y-axis (substantially longitudinal) and creates a communication channel between mobile user 302, satellite 102, and/or a fixed user. As user 302 travels in direction 306, beam 304 moves in a direction 308 that is normal to the plane of beam 304 to continuously provide a communication channel to user 302. In one embodiment, beam 304 travels along the x-axis such that movement direction 308 of beam 304 is substantially longitudinal. As such, beam 304 is configured to provide a communication channel to user 302 for any pattern of movement and/or travel that user 302 may take.

Referring to FIG. 4, satellite 102 and/or antenna assembly 112 transmits a steerable fan beam 342 to user 302. In the exemplary embodiment, beam 342 is substantially parallel with the y-axis (substantially latitudinal) and creates a communication channel between mobile user 302, and/or satellite 102. As user 302 travels in direction 344, beam 342 moves in a direction 346 that is normal to the plane of beam 342 to continuously provide a communication channel to user 302. In one embodiment, beam 342 travels along the x-axis such that movement direction 346 of beam 342 is substantially latitudinal. As such, beam 304 is configured to provide a communication channel to user 302 for any pattern of movement and/or travel that user 302 may take.

Figure 5:
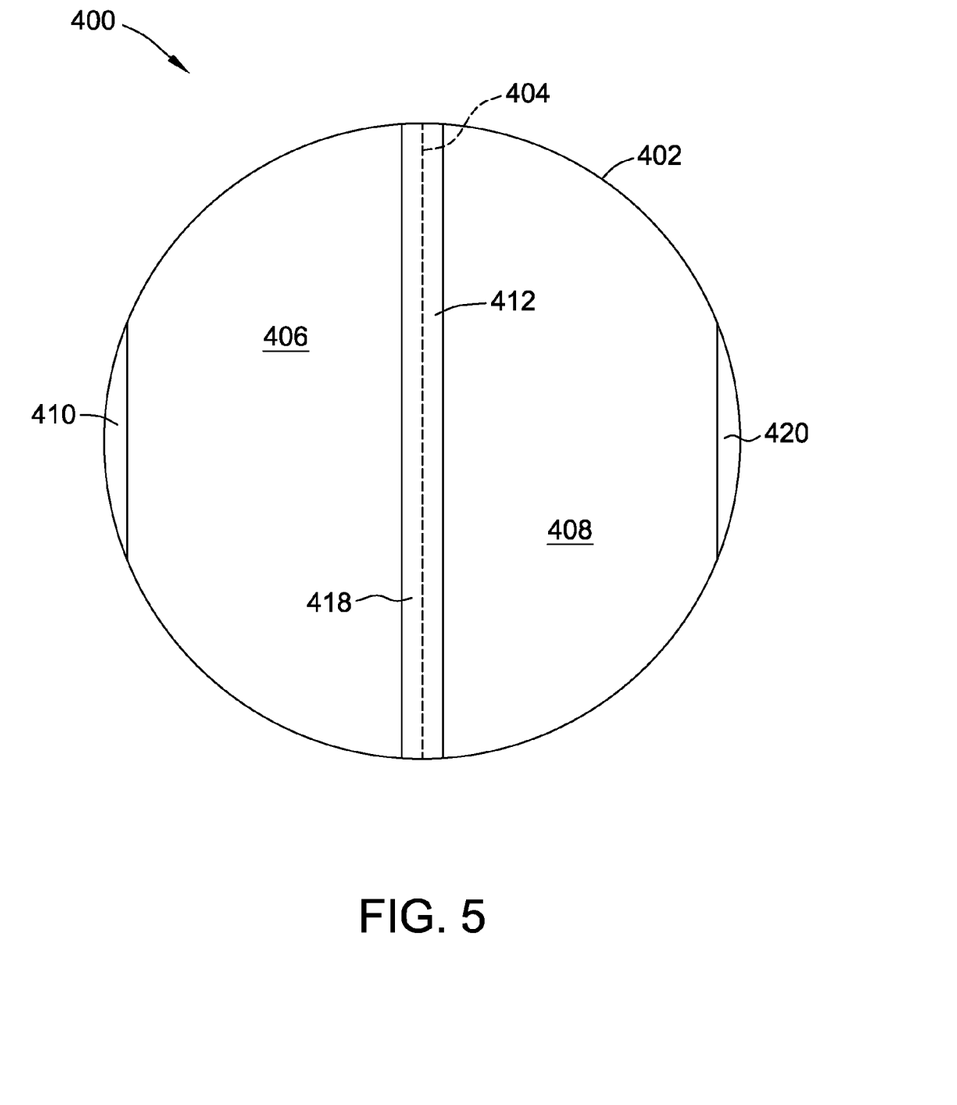
FIG. 5 is an illustration of an exemplary transmit coverage map that may be used with the system shown in FIG. 1.

FIG. 5 is an illustration of an exemplary transmit coverage map 400 that may be used with system 100 (shown in FIG. 1). Coverage map 400 includes a coverage area 402 for steerable fan beams such as beams 114 and 116 (shown in FIG. 1), beam 304 (shown in FIG. 3), and beam 342 (shown in FIG. 4) that is formed from beams transmitted by first linear transmit array 202 and second linear transmit array 204. In the exemplary embodiment, beams are transmitted by arrays 202 and 204 using circular polarizations. Coverage area 402 is bisected by a beam center 404 creating a first coverage area portion 406 and a second coverage area portion 408.

In the exemplary embodiment, first transmit array 202 transmits a signal providing beam coverage area 406 and second transmit array 204 transmits a signal providing beam coverage area 408. Coverage map 400 includes the combination of the signal from first transmit array 202 and the signal from second transmit array 204 such that a frequency reuse is employed. As such, a mobile user's communications frequency corresponds to a position on a selected axis of motion creating a 1:1 relationship. Such a relationship enables the mobile user to achieve a maximum gain while moving.

Coverage areas 406 and 408 are combined in an overlap fashion to maximize coverage area 402 of coverage map 400 in a frequency reuse to minimize and/or eliminate signal interference between coverage areas 406 and 408. In one embodiment, the frequency reuse includes a pattern of frequency spread from a low frequency to high frequency in coverage areas 406 and 408. For example, portion 410 of coverage area 406 includes the lowest frequency of coverage area 406. Similarly, portion 412 of coverage area 408 includes the lowest frequency of coverage area 408. Portion 418 of coverage area 406 includes the highest frequency of coverage area 406 and portion 420 of coverage area 408 includes the highest frequency of coverage area 408. Such a frequency reuse enables portion 418 of coverage area 406 to overlap with portion 412 of adjacent coverage area 408 without signal interference.

In the exemplary embodiment, coverage area 402 is substantially circular. In one embodiment, coverage area is 120° of coverage of the Earth, with a height of 7,078 miles and a width of 16,580 miles. Alternatively, coverage area 402 can have any shape or size that facilitates communication with a mobile user as described herein. In one embodiment, a width of coverage area 402 is varied to change a symbol rate of coverage map 400 to match a predetermined rate. Coverage map 400 is configured to follow a mobile user in motion in the direction normal to the plane in which coverage map 400 is constructed.

Figure 6:
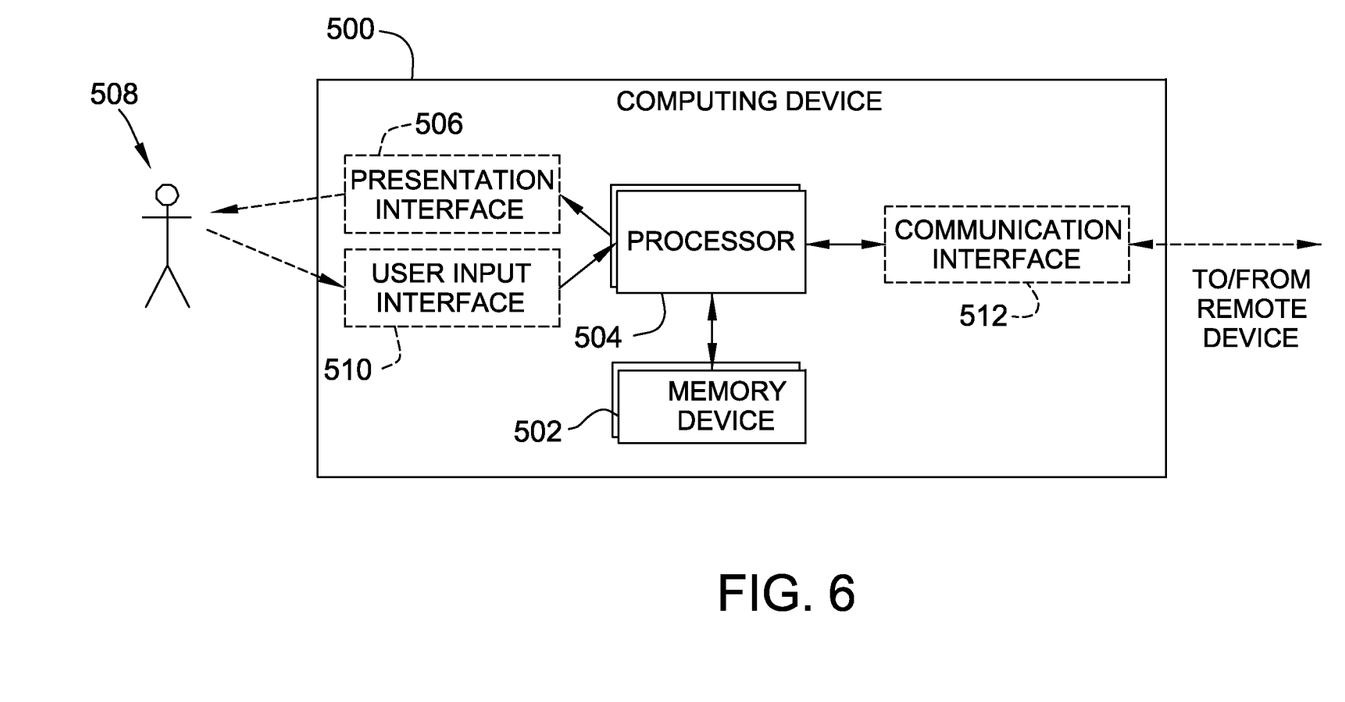
FIG. 6 is a block diagram of an exemplary computing device that may be used with the system shown in FIG. 1.

FIG. 6 is a block diagram of an exemplary computing device 500 that may be used with system 100 (shown in FIG. 1). In one embodiment, computing device 500 is used on and/or integrated into satellite 102 and/or ground station 104. In another embodiment, computing device 500 is a portable computing device, such as a mobile user. Computing device 500 includes at least one memory device 502 and a processor 504 that is coupled to memory device 502 for executing instructions. In some embodiments, executable instructions are stored in memory device 502. In the exemplary embodiment, computing device 500 performs one or more operations described herein by programming processor 504. For example, processor 504 may be programmed by encoding an operation as one or more executable instructions and by providing the executable instructions in memory device 502.

Processor 504 may include one or more processing units (e.g., in a multi-core configuration). Further, processor 504 may be implemented using one or more heterogeneous processor systems in which a main processor is present with secondary processors on a single chip. As another illustrative example, processor 504 may be a symmetric multi-processor system containing multiple processors of the same type. Further, processor 504 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, processor 504 determines a location of a mobile user and follows, tracks, and/or travels with the mobile user, as described herein. Processor 504 also determines a beam strength to apply to each beam transmitted by an antenna assembly such that power can be pooled or utilized in varying intensities.

In the exemplary embodiment, memory device 502 is one or more devices that enable information such as executable instructions and/or other data to be stored and retrieved. Memory device 502 may include one or more computer readable media, such as, without limitation, dynamic random access memory (DRAM), static random access memory (SRAM), a solid state disk, and/or a hard disk. Memory device 502 may be configured to store, without limitation, application source code, application object code, source code portions of interest, object code portions of interest, configuration data, execution events and/or any other type of data.

In some embodiments, computing device 500 includes a presentation interface 506 that is coupled to processor 504. Presentation interface 506 presents information, such as application source code and/or execution events, to a user 508. For example, presentation interface 506 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 506 includes one or more display devices. In the exemplary embodiment, presentation interface 506 displays the location and movement pattern of a mobile user as a point on a map (such as shown in FIGS. 3 and 4), and/or any format that enables a user to observe a location and movement of a mobile user.

In the exemplary embodiment, computing device 500 includes a user input interface 510. In the exemplary embodiment, user input interface 510 is coupled to processor 504 and receives input from user 508. User input interface 510 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 506 and user input interface 510.

In the exemplary embodiment, computing device 500 includes a communication interface 512 coupled to processor 504. Communication interface 512 communicates with one or more remote devices. To communicate with remote devices, communication interface 512 may include, for example, a wired network adapter, a wireless network adapter, and/or a mobile telecommunications adapter.

Figure 7:
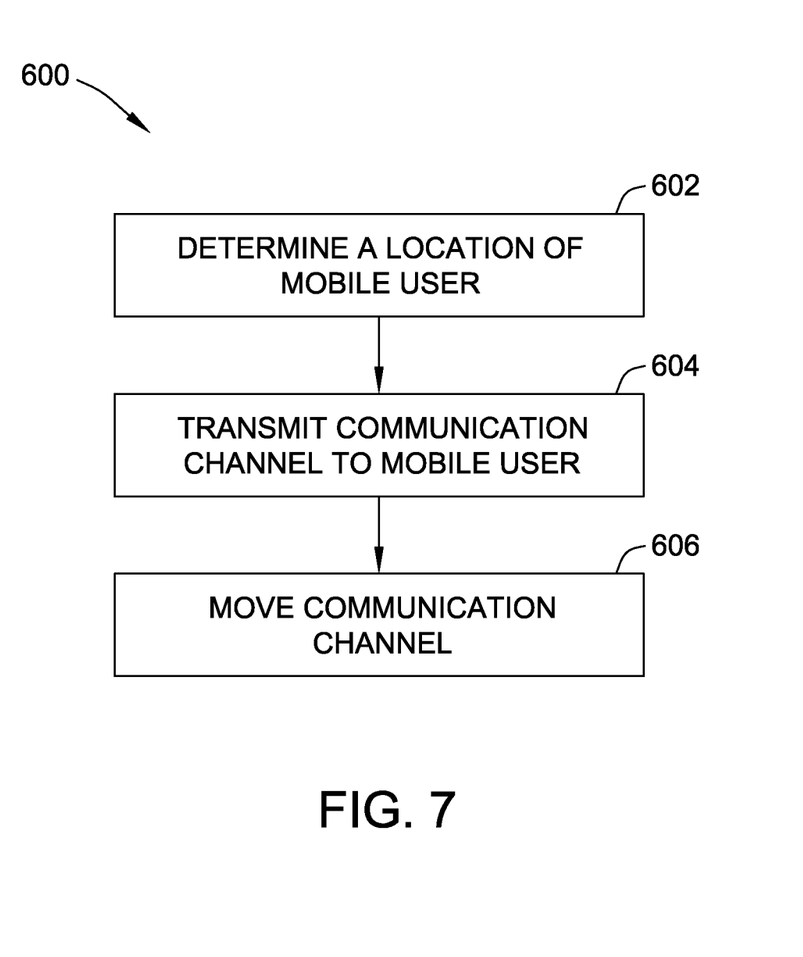
FIG. 7 is a flowchart of an exemplary method that may be implemented by the system shown in FIG. 1.

FIG. 7 is a flowchart of an exemplary method 600 for use in providing a communication channel to a mobile user, such as mobile user 106 using system 100 (both shown in FIG. 1). In the exemplary embodiment, a mobile user's location is determined 602. In one embodiment, the mobile user's location is determined 602 by receiving location information from a ground station, such as ground station 104. For example, a ground station may transmit known GPS coordinates of the mobile user. Alternatively, a transmitter, such as satellite 102 and/or ground station 104, determines 602 a location of a mobile user using stored information including, but not limited to, a mobile user's itinerary. The itinerary may include any travel information, including but not limited to, a ship route and an airline route.

A communication channel is transmitted 604 to determined 602 mobile user via a transmitter. In the exemplary embodiment, the communication channel is a spot beam or a fan beam including a coverage area, such as coverage map 400 (shown in FIG. 5) and is transmitted from first linear array 202 and second linear array 204 (shown in FIG. 2), via at least one offset cylindrical reflector. The communication channel is transmitted 604 using a carrier frequency intended for a mobile user such that a 1:1 relationship is created between a carrier frequency and the location of the mobile user. Such a relationship enables the mobile user to achieve a maximum gain while moving. In one embodiment, the communication channel is transmitted 604 to the determined 602 location of the mobile user. As such, the beam transmitted 604 is steerable to an exact location of the mobile user. The beam is transmitted 604 such that the beam center is substantially aligned with the mobile user. In one embodiment, the beam is steered from a location remote from the transmitter. For example, a beam transmitted 604 from satellite 102 to mobile user 106 may be steered by ground unit 104. Alternatively, the beam is steered autonomously by the transmitter.

In one embodiment, transmitting 604 a communication channel includes adjusting a size and/or shape of the communication channel transmitted 604 to a particular mobile user based on predetermined requirements, including but not limited to, traffic density. In some implementations, the transmitted 604 communication channel is biased to provide a higher gain in dense areas of traffic. In the exemplary embodiment, transmitting 604 a communication channel includes determining a power requirement for the beam. For example, a beam may require additional power when transmitted 604 to a mobile user at or near inclement weather. As such, the method described herein enables a pooling or adjustment of power of the beams transmitted by system 100. In the exemplary embodiment, power requirements for beams is adjusted locally by the transmitter continuously, however, the power requirements may be adjusted in any manner that facilitates providing a communication channel to a mobile user as described herein.

Once the beam has been transmitted 604 to the user, the transmitter transmitting the beam moves 606 the beam to maintain the communication channel with the mobile user as the user travels. In one embodiment, movement 606 of the beam is commanded from a remote location, such as ground station 104. For example, the transmitter may move 606 the beam to substantially match an itinerary received for the mobile user. Alternatively, movement 606 is predicted in near real-time utilizing signals received from the mobile user. In the exemplary embodiment, the communication channel moves 606 or traverses on an axis in a direction that is normal to the plane of the transmitted 604 beam (as shown in FIGS. 3 and 4). It should be noted that method 600 can occur on system 100 in a continuous loop to concurrently provide multiple beams to multiple mobile users, such that each mobile user maintains a 1:1 relationship with a beam's carrier frequency.

The embodiments described herein enable a communication channel to be provided to a mobile user during travel. As compared to at least some known communication systems, the systems and methods described herein are capable of providing communication channels without the use of terrestrial networks to provide communication channels and are limited by geographical restrictions. While at least some known communication systems use a single beam to cover areas unreachable by terrestrial systems, the systems and methods described herein utilize multiple beams allowing many mobile users to obtain a dedicated communication channel that can travel with the mobile user. Additionally, in at least some known communication systems, the beams used have a fixed power such that beams are transmitted whether or not a user is in need of the communication channel. Further, the systems and methods described herein improve efficiency by providing communication channels only when needed and can pool or adjust power of the channels as required.

The embodiments described herein may utilize executable instructions embodied in a non-transitory computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A communication system for use in providing a communication channel using a steerable beam to a mobile user, the communication system comprising:
   a ground station; and
   a transmitter communicatively coupled to the ground station, the transmitter comprising:
      a first linear transmit array of radiating horns;
      a second linear transmit array of radiating horns; and
      at least one reflector coupled to at least one of the first linear transmit array and the second linear transmit array, the at least one reflector configured to reflect illumination from the first and second linear transmit arrays to form a communication channel for the mobile user;
   wherein the transmitter is configured to:
   determine a power requirement for the communication channel to a mobile user located in a first position;
   provide the communication channel to the mobile user located in the first position, wherein a 1:1 relationship exists between a carrier frequency of the communication channel and a location of the mobile user;
   receive an update to the current location of the mobile user, wherein the mobile user is located in a second position, wherein the first position and the second position are different;
   move the steerable beam in response to the update of the current location of the mobile user such that a center of the steerable beam is substantially aligned with the mobile user, wherein the steerable beam is moved to ensure that the communication channel travels along with the mobile user, and wherein the steerable beam is transmitted by the first and second linear transmit arrays using circular polarizations; and
   adjust a size and a shape of the communication channel to the mobile user based on traffic density and the power requirement for the beam based on the update of the current location of the mobile user.

2. The communication system according to claim 1, wherein the at least one reflector is a cylindrical reflector configured to form a fan-shaped communication channel.

3. The communication system according to claim 1, wherein the transmitter further comprises a broadcast antenna for providing a communication channel to users of the communication system.

4. The communication system according to claim 1, wherein the transmitter further comprises a gateway antenna configured to at least one of transmit and receive signals from the ground station.

5. The communication system according to claim 1, further comprising a computing device configured to determine a power requirement of the communication channel.

6. The communication system according to claim 1, wherein the transmitter is a satellite.

7. A method of using a steerable beam to provide a communication channel to a mobile user comprising:
  receiving a communication channel from a transmitter located in a substantially stationary position;
  determining a power requirement for the communication channel to a mobile user located in a first position;
  providing the communication channel to the mobile user located in the first position, wherein a 1:1 relationship exists between a carrier frequency of the communication channel and a location of the mobile user;
  receiving an update to the current location of the mobile user, wherein the mobile user is located in a second position, wherein the first position and the second position are different;
  moving the steerable beam in response to the update of the current location of the mobile user such that a center of the steerable beam is substantially aligned with the mobile user, wherein the steerable beam is moved to ensure that the communication channel travels along with the mobile user, and wherein the steerable beam is transmitted by the first and second linear transmit arrays using circular polarizations; and
  adjusting a size and a shape of the communication channel to the mobile user based on traffic density and the power requirement for the beam based on the update of the current location of the mobile user.

8. The method according to claim 7, wherein providing a communication channel from a transmitter comprises providing a communication channel from a satellite.

9. The method according to claim 7, further comprising providing a broadcast channel.

10. The method according to claim 7, further comprising providing a second communication channel to a second mobile user.

11. The method according to claim 7, further comprising adjusting a power of the communication channel.

* * * * *